United States Patent
Lazarus et al.

(10) Patent No.: US 10,967,281 B2
(45) Date of Patent: Apr. 6, 2021

(54) AUTOMATIC FANTASY SPORTS DATA ANALYSIS METHOD AND APPARATUS

(71) Applicant: VERIZON MEDIA INC., New York, NY (US)

(72) Inventors: Michael Lazarus, Simi Valley, CA (US); Maxim Sviridenko, New York, NY (US); Justin Thaler, New York, NY (US)

(73) Assignee: VERIZON MEDIA INC., New York, NY (US)

( * ) Notice: Subject to any disclaimer, the term of this patent is extended or adjusted under 35 U.S.C. 154(b) by 0 days.

(21) Appl. No.: 16/672,487

(22) Filed: Nov. 3, 2019

(65) Prior Publication Data

US 2020/0129867 A1    Apr. 30, 2020

Related U.S. Application Data

(63) Continuation of application No. 15/197,875, filed on Jun. 30, 2016, now Pat. No. 10,463,975.

(51) Int. Cl.
    *A63F 13/828*      (2014.01)
    *A63B 71/06*      (2006.01)
    (Continued)

(52) U.S. Cl.
    CPC ............ *A63F 13/828* (2014.09); *A63B 71/06* (2013.01); *A63B 71/0616* (2013.01); *A63F 13/35* (2014.09); *A63F 13/46* (2014.09); *A63F 13/65* (2014.09); *A63F 13/795* (2014.09); *A63F 2300/69* (2013.01); *A63F 2300/8052* (2013.01)

(58) Field of Classification Search
    CPC ........ A63F 13/828; A63F 13/65; A63F 13/69; A63F 13/795; A63F 2300/8052; A63B 71/06; A63B 71/0616
See application file for complete search history.

(56) References Cited

U.S. PATENT DOCUMENTS

| | | |
|---|---|---|
| 5,860,862 A | 1/1999 | Junkin |
| 6,289,348 B1 | 9/2001 | Richard et al. |
| (Continued) | | |

OTHER PUBLICATIONS

Zelvin, Alex; "Behind FanDuel's Salary Cap"; RotoGrinders; FanDuel Fantasy Sports Salary Cap Calculation; https://rotogrinders.com/articles/behind-fanduel-s-salary-cap-956; 4 pages (2011).

(Continued)

*Primary Examiner* — William H McCulloch, Jr.
(74) *Attorney, Agent, or Firm* — James J. DeCarlo; Greenberg Traurig, LLP

(57) ABSTRACT

Disclosed are systems and methods for improving interactions with and between computers in content generating, searching, hosting and/or providing systems supported by or configured with personal computing devices, servers and/or platforms. The systems interact to identify and retrieve data within or across platforms, which can be used to improve the quality of data used in processing interactions between or among processors in such systems. The disclosed systems and methods provide systems and methods for automatic fantasy sports data analysis, including analysis of data to equalize player attractiveness in contestant composition of a fantasy sports team.

20 Claims, 8 Drawing Sheets

(51) Int. Cl.
  *A63F 13/795* (2014.01)
  *A63F 13/65* (2014.01)
  *A63F 13/46* (2014.01)
  *A63F 13/35* (2014.01)

(56) References Cited

U.S. PATENT DOCUMENTS

| | | |
|---|---|---|
| 6,430,539 B1 | 8/2002 | Lazarus et al. |
| 6,669,565 B2 | 12/2003 | Liegey |
| 7,351,150 B2 | 4/2008 | Sanchez |
| 7,618,312 B1 | 11/2009 | Kasten |
| 7,762,878 B2 | 7/2010 | Nicholas et al. |
| 8,052,521 B2 | 11/2011 | Webb et al. |
| 9,849,381 B2 | 12/2017 | Hood |
| 9,855,503 B2 | 1/2018 | Nangia |
| 9,878,234 B2 | 1/2018 | Moller |
| 9,984,535 B2 | 5/2018 | Odom |
| 10,220,321 B2* | 3/2019 | Baazov ............ A63F 13/828 |
| 10,248,290 B2 | 4/2019 | Galfond et al. |
| 10,258,890 B2* | 4/2019 | Amaitis ............ A63F 13/828 |
| 10,343,074 B2* | 7/2019 | Thormann ............ A63F 13/65 |
| 10,463,975 B2* | 11/2019 | Lazarus ............ A63B 71/06 |
| 10,737,182 B2* | 8/2020 | Martin ............ A63F 13/828 |
| 10,744,415 B2* | 8/2020 | Sloan ............ A63F 13/828 |
| 2002/0107590 A1 | 8/2002 | Liegey |
| 2006/0064184 A1 | 3/2006 | Ream et al. |
| 2006/0105827 A1 | 5/2006 | Metzger et al. |
| 2006/0217198 A1 | 9/2006 | Johnson |
| 2006/0258421 A1 | 11/2006 | Nicholas et al. |
| 2006/0259389 A1 | 11/2006 | Richter |
| 2007/0021853 A1 | 1/2007 | Ma et al. |
| 2007/0054718 A1 | 3/2007 | Del Prado |
| 2007/0203591 A1 | 8/2007 | Bowerman |
| 2007/0233585 A1 | 10/2007 | Ben Simon et al. |
| 2008/0026804 A1 | 1/2008 | Baray et al. |
| 2008/0096664 A1 | 4/2008 | Baray et al. |
| 2008/0102911 A1 | 5/2008 | Campbell et al. |
| 2008/0153589 A1 | 6/2008 | Baray et al. |
| 2008/0215168 A1 | 9/2008 | Charchian |
| 2008/0280685 A1 | 11/2008 | Hansen et al. |
| 2008/0281444 A1 | 11/2008 | Krieger et al. |
| 2009/0011835 A1 | 1/2009 | Hansen et al. |
| 2009/0023495 A1 | 1/2009 | Koustas et al. |
| 2009/0156312 A1 | 6/2009 | Ng et al. |
| 2010/0100204 A1 | 4/2010 | Ng et al. |
| 2011/0183731 A1 | 7/2011 | Barry |
| 2012/0095577 A1 | 4/2012 | Golding |
| 2012/0149472 A1 | 6/2012 | Miller |
| 2012/0149473 A1 | 6/2012 | Moore et al. |
| 2012/0220375 A1 | 8/2012 | Williams |
| 2012/0270614 A1 | 10/2012 | Robinson |
| 2012/0270615 A1 | 10/2012 | Jones et al. |
| 2012/0270619 A1 | 10/2012 | Nicholas et al. |
| 2012/0283858 A1 | 11/2012 | Lapadula |
| 2012/0289340 A1 | 11/2012 | Pawson |
| 2013/0017874 A1 | 1/2013 | Trdinich et al. |
| 2013/0079130 A1 | 3/2013 | Takacs |
| 2015/0057074 A1 | 2/2015 | Geller et al. |
| 2017/0095739 A1 | 4/2017 | Thaler et al. |
| 2018/0001215 A1 | 1/2018 | Lazarus et al. |
| 2019/0143225 A1* | 5/2019 | Baazov ............ A63F 13/35 463/25 |
| 2019/0176041 A1* | 6/2019 | Thaler ............ A63F 13/65 |
| 2019/0176042 A1* | 6/2019 | Thaler ............ G07F 17/3276 |
| 2019/0362600 A1* | 11/2019 | Odom ............ G07F 17/3288 |
| 2020/0061476 A1* | 2/2020 | Gabrail ............ A63F 13/55 |
| 2020/0302745 A1* | 9/2020 | Merati ............ G07F 17/3244 |
| 2020/0360822 A1* | 11/2020 | Mix ............ A63F 13/46 |

OTHER PUBLICATIONS

Allen, Sam; "How do daily fantasy sports sites (such as Fanduel) determine athletes' salary?"; https://www.quora.com/How-do-daily-fantasy-sports-sites-such-as-Fanduel-determine-athletes-salary/answer/Sam-Allen-3?srid=onLf&share=1; 1 page (2012).

Paradise, Jason; "How do daily fantasy sports sites (such as Fanduel) determine athletes' salary?"; https://www.quora.com/How-do-daily-fantasy-sports-sites-such-as-Fanduel-determine-athletes-salary/answer/Jason-Paradise?srid=onLf&share=1; 1 page (2012).

Blinders; "FSL Shares How They Calculate Player Salaries", Fantasy Sports Live Daily Fantasy Sports Salary Cap Calculation; https://rotogrinders.com/articles/fsl-shares-how-they-calculate-player-salaries-930; 5 pages (2011).

* cited by examiner

```
<projection type="daily" ID="5909" game_date="5/27/2016"
gameID="1599012"
gp="1"
batGS="0.9646739"
batAB="3.66658"
batR="0.4860014"
batH="0.9860885"
bat1B="0.515126"
bat2B="0.2434251"
bat3B="7.221418E-04"
batHR="0.2268152"
batRBI="0.7100365"
batSH="0"
batSF="0.0502618"
batSB="6.803823E-04"
batCS="0"
batBB="0.5214334"
batK="0.7062368"
batGIDP="0.1265511"
batTB="1.911404"
batPO="0.346995"
batAst="3.401912E-02"
batE="6.803823E-03"
batFldPct="0.9824561"
batAvg="0.2689396"
batOBP="0.3599684"
batSLG="0.5213042"
batOPS="0.8812726"
batXBH="0.4709625"
batNSB="6.803823E-04"
batSBPct="1"
batPA="4.266592"
BatOFAst="0"
batDPTurned="1.360765E-02"
batCI="0"
pitchApp="1"
pitchGS="0"  pitchInnings="0" pitchW="0" pitchL="0" cg="0"
shutouts="0" sv="0" outs="0" pitchHits="0" pitchBF="0" pitchRuns="0"
pitchER="0" pitchHR="0" pitchBB="0" pitchK="0" pitchWP="0"
bk="0" hld="0" pitchTB="0" era="0" whip="0" kperbb="0" kper9="0"
pitch1b="0" pitch2b="0" reliefApp="1" pitchOBP="0" wpct="0" hper9="0"
bbper9="0" qs="0" bs="0" netsv="0" svhld="0" netsvhld="0"/>
```

Figure 5

MLB (Non-Pitchers):

| | | |
|---|---|---|
| F1: | 30% | Fantasy Point Projection |
| F2: | 50% | Past Performance over last 30 games |
| F3: | 15% | Past Performance over last 80 games |
| F4: | 5% | Past Performance over last 5 games |
| A: | 2.62 | Scaling Coefficient |
| GSF: | $7 | Global Salary Floor |

MLB (Pitchers):

| | | |
|---|---|---|
| F1: | 60% | Fantasy Point Projection |
| F2: | 25% | Past Performance over last 5 games |
| F3: | 15% | Past Performance over all starts for current season |
| A: | 2.31 | Scaling Coefficient |
| GSF: | $25 | Global Salary Floor |

NFL (QB, RB, WR, TE, D):

| | | |
|---|---|---|
| F1: | 50% | Fantasy Point Projection |
| F2: | 25% | Past Performance over last 4 games |
| F3: | 25% | Past Performance over last 10 games |
| F4: | 15% | Past Performance over last 80 games |
| A: | 2.02 | QB Scaling Coefficient |
| | 2.10 | WR Scaling Coefficient |
| | 2.36 | RB Scaling Coefficient |
| | 2.20 | TE and D Scaling Coefficient |
| GSF: | $20 | QB Global Salary Floor |
| | $10 | Non-QB Global Salary Floor |

NHL (Goalies):

| | | |
|---|---|---|
| F1: | 40% | Fantasy Point Projection |
| F2: | 5% | Past Performance over last 5 games |
| F3: | 35% | Past Performance over last 15 games |
| F4: | 20% | Past Performance over last 40 games |
| A: | 2.9 | Scaling Coefficient |
| GSF: | $20 | Global Salary Floor |

NHL (Non-Goalies):

| | | |
|---|---|---|
| F1: | 40% | Fantasy Point Projection |
| F2: | 15% | Past Performance over last 5 games |
| F3: | 30% | Past Performance over all last 15 games |
| F4: | 15% | Past Performance over last 40 games |
| A: | 3.00 | Scaling Coefficient |
| GSF: | $12 | Global Salary Floor |

Figure 6A

NBA:

| | | |
|---|---|---|
| F1: | 15% | Fantasy Point Projection |
| F2: | 20% | Past Performance over last 5 games |
| F3: | 65% | Past Performance over last 30 games |
| A: | 1.0 | Scaling Coefficient |
| GSF: | $10 | Global Salary Floor |
| OP: | $2 | Salary increase for athlete using following criteria: |

1-game series:    athlete owned 2x more than the expected average ownership in the previous contest where the athlete appears
    2-game series:    athlete is owned $\geq$ 66.0% of lineups
    3-game series:    athlete is owned $\geq$ 44.4% of lineups
    4-game series:    athlete is owned $\geq$ 33.3% of lineups
    5-game series:    athlete is owned $\geq$ 26.6% of lineups
    6-game series:    athlete is owned $\geq$ 22.2% of lineups
    7-game series:    athlete is owned $\geq$ 19.0% of lineups
    8-game series:    athlete is owned $\geq$ 16.6% of lineups
    9-game series:    athlete is owned $\geq$ 14.8% of lineups
    10-game series:    athlete is owned $\geq$ 13.4% of lineups
    11-game series:    athlete is owned $\geq$ 12.2% of lineups
    12-game series:    athlete is owned $\geq$ 11.2% of lineups
    13-game series:    athlete is owned $\geq$ 10.2% of lineups
    14-game series:    athlete is owned $\geq$ 9.6% of lineups
    15-game series:    athlete is owned $\geq$ 8.8% of lineups A maximum of one series per day is used for the percentage-owned adjustment (the series with the most contests in a given day is used)

The maximum salary for a NBA player at any point this season is capped, e.g., at $60 until late-season and then $54.

Figure 6B

AUTOMATIC FANTASY SPORTS DATA ANALYSIS METHOD AND APPARATUS

CROSS REFERENCE TO RELATED APPLICATIONS

This application claims the benefit of and is a continuation of U.S. patent application Ser. No. 15/197,875, filed Jun. 30, 2016, titled "Automatic Fantasy Sports Data Analysis Method and Apparatus", which is incorporated by reference herein in its entirety.

FIELD OF THE DISCLOSURE

The present disclosure relates to analyzing short-term fantasy sports data, including historical data involving the performance of athletes in real world competitions and the popularity athletes with fantasy sport contestants, for use in short-term fantasy sports contests.

BACKGROUND

Daily fantasy contests are a fast growing market. By way of a non-limiting example, in fantasy sports, participants build a team of real-world athletes, and the team earns points based on the actual real world performance of the athletes in real world competitions. For example, if a participant in a fantasy basketball league has Lebron James on his or her team, then the user will earn points based on the statistics Lebron James produces in actual basketball games.

SUMMARY

Traditional fantasy sports contests typically run for an entire professional sports season. Short-term fantasy sports contests typically run for a much shorter period of time, e.g., one or more days, a week, etc. The Fantasy Sports Trade Association Estimates that in 2015 more than 56 million people actively played traditional fantasy sports; and this number continually increases. Online cash prize tournaments, such as short-term (e.g. daily, weekly, series) fantasy sports contests, are quickly becoming a central part of the sports industry. However, there are a number of issues associated with running a large-scale, prize driven, online fantasy sports system.

Conventional fantasy sports contests allow a contestant (or participant or entrant) to build a fantasy sports team for a particular fantasy sports contest by "drafting" actual players, or athletes, that play in the real world contest(s) on which the fantasy sports contest is based to the fantasy sports team (or lineup) of the contestant. In one example, a contestant that wishes to participate in a fantasy sports basketball contest can draft, e.g., add, Lebron James to the contestant's fantasy basketball team. Each athlete earns "fantasy points" based on each drafted athlete's performance during the period, e.g., one day, of the fantasy sports contest. The "fantasy points" earned (or scored) by an athlete are earned by a contestant that included the athlete in the contestant's fantasy sports team. Each contestant participating in a particular contest are ranked relative to each other contestant based on the number of fantasy points that the contestant's team scores, and prize money is paid out based on rank.

One of the issues associated with running a large-scale online fantasy sports system involves "drafting" players to a fantasy sports team. In the real world, a salary cap can be imposed on a contestant building a team, such that each athlete's fantasy salary counts against the fantasy salary cap. As such, the contestant has to consider the impact of an athlete's fantasy salary relative to the fantasy cap when building a fantasy team. It is desirable to be able to mimic, to some extent, team drafting (or team building) in the real world in an online fantasy sports system; however, there are aspects that make an online fantasy sports draft (or team building exercise) uniquely different from the real world. For example, in an online fantasy sports system, the same player can be drafted by multiple contestants and for multiple teams, which can result in duplication across fantasy sports teams. When contestants draft identical, nearly identical or very similar teams, the contestants score the same, or a similar, number of points in the contest, which makes it difficult to rank contestants for purposes of determining the wining contestants and/or awarding prizes.

The present disclosure provides novel systems and methods for automatic fantasy sports data analysis, including analysis of data to equalize player attractiveness in contestant composition of a fantasy sports team. Attractiveness equalization, e.g., making enough athletes roughly equally attractive, minimizes lineup duplications, e.g., minimizes the likelihood that contestants draft identical, nearly identical or very similar teams.

In order for an online fantasy sports system to impose a fantasy salary cap on a contestant, a fantasy salary for each athlete that is eligible for selection by a contestant must be set before a contest is offered online by the system. For a number of reasons, a manual approach to determining athletes' salaries is at the very least not viable. Firstly, a contest provider, such as Yahoo! Sports, is not permitted to alter athletes' fantasy salaries once the contest provider announces the fantasy salaries. This makes accuracy in fantasy salary determinations a key consideration; and, a manual approach can easily introduce inaccuracies. In addition to the need for accuracy, a need for timely determinations makes manual determination of fantasy salaries for athletes unacceptable. Contests are typically published by a contest provider many hours or days before the start time of the real-world competition on which the contest is based. Making a contest available as soon as possible benefits both the contestant and the contest provider. The contestant benefits by having more time to review available contests and draft a team of athlete(s) for the contest; and, the contest provider benefits by an increased likelihood that the provider's published contest is filled with contestants before the contest must be closed to new contestants. By publishing a contest as soon as possible, a contest provider has more time to judge the demand and to add additional contests to meet the demand. However, a contest cannot be published by a provider, and thereby made available to users of an online fantasy sports system, until the athletes' fantasy salaries are set. An automated approach is more accurate, more efficient and timelier than a manual approach. An automated approach can accurately, efficiently and speedily analyze historical data involving the performance of athletes in real world competitions and the popularity athletes with fantasy sport contestants to generate the athletes' fantasy salaries required to publish a fantasy sports.

In addition to the above reasons, the sheer number of fantasy salaries that must be determined on a daily basis is another reason that a manual approach is not a viable approach. As an example, an online fantasy sports system can have, on average, over 1000 contests per day and involve a number of different sports, and a number of athletes per sport. A contest can be based on any type of sport, e.g., soccer, baseball, basketball, football, hockey, tennis, boxing, auto racing, golf, etc., at various levels, e.g., professional, collegiate, international, national, etc., both male and female athletes, etc. On a daily basis, for example, approximately 750 fantasy salaries for Major League Baseball (MLB) athletes must be determined before a fantasy contest provider can publish a MLB fantasy sports contests, approximately 240 fantasy salaries must be determined for National Basketball Association (NBA) athletes, 350 fantasy salaries for National Hockey League (NHL) athletes, and 175 fantasy salaries for European Premier League (EPL) soccer athletes. In addition and on a weekly basis, approximately 540 fantasy salaries for National Football League (NFL) athletes must be determined before a fantasy football contest can be published by a contest provider. Furthermore and as discussed above, each one of the 750 MLB fantasy salaries, 240 NBA fantasy salaries, 350 NHL fantasy salaries, 175 EPL fantasy salaries, 540 NFL fantasy salaries, etc., must be accurately, timely and efficiently determined, which further points to the need for an automated approach.

To summarize, the need for accuracy and timeliness in determining fantasy salaries, the significant number fantasy salaries that must be determined, the frequency at which the fantasy salaries must be updated each point to a need for an automated approach for determining fantasy sports salaries, such as that provided with the systems and methods provided herein.

According to some embodiments, the disclosed systems and methods first determine a value for each of a number of factors used in determining an athlete's fantasy salary and then use a weighted combination, e.g., a linear combination, of values determined for the factors to make a fantasy salary determination for each athlete of a plurality of athletes. The factors include a fantasy point projection factor (or fantasy point projection), a number of past performance factors (or past performance(s)), and an ownership factor (or ownership). For an athlete, the fantasy point projection is a prediction of the number of fantasy points the athlete is likely to score in a real world competition if the athlete participates, or starts, in the real world competition. The fantasy point projection takes into account specifics of the real world competition, such as the quality of the athlete's opponent, whether the athlete is playing at home or on the road, whether the athlete tends to perform better or worse at home or on the road, etc. The number of past performance factors may comprise, for example, one or more of an immediate past performance factor (or immediate past performance), recent past performance factor (or recent past performance) and a historical past performance factor (or historical past performance). The historical past performance factor provides a long-term baseline of the athlete's past performance, and the immediate and recent past performance factors are responsive to "recent" real world circumstances that are likely to impact the athlete's long-term baseline. Examples of real world circumstances likely to impact an athlete's performance include the athlete's health, change in the athlete's role on the team, etc. The historical scope (or range) of each performance factor may vary depending on sport, athlete position, and number of "starts" by the athlete considered in determining each of these performance values.

The ownership factor takes into account intangible aspects, such as an athlete's likability or popularity. An athlete's likability or popularity can be determined using data from past fantasy sports contests for which the athlete was available for selection by contestants, such as and without limitation the percentage of contestants that drafted the athlete, the percentage of fantasy teams (built by contestants) that included the athlete, etc. In some embodiments, the ownership factor can be used as an incentive or a disincentive. For example, the ownership factor can be varied in order to increase a popular athlete's fantasy salary, thereby acting as a disincentive for selection by a contestant working with a salary cap. As yet another example, the ownership factor can be decreased as an incentive for selection. In other words, the ownership factor for an athlete can be varied based on a determined popularity of the athlete to make the athlete more or less attractive to contestants.

The disclosed systems and methods use the fantasy point projection, past performance and ownership factors determined for a given athlete to determine the athlete's fantasy salary. Each factor may have an associated weight that can be used in the fantasy salary determination for the athlete. The weights assigned to each factor, which can vary, can be reflective of a desired importance of each factor on the salary determination. As is described in more detail herein, a global salary floor, or global minimum fantasy salary threshold, can be set and used to verify that an athlete's fantasy salary is at least equal to the global salary floor. In addition, an individual salary floor, or individual minimum threshold salary, can be set for an individual athlete.

As discussed below in more detail, the fantasy salaries automatically determined for a plurality of athletes in accordance with embodiments of the present disclosure can be published with a contest by an online fantasy sports system, and used to limit, along with a fantasy sports salary cap set for a contest, a fantasy sports contestant's selection of athletes for a given contest. The determined fantasy salaries can be published by displaying the fantasy salaries on a display at a contestant's (e.g., an online fantasy sports system user) computing device, for example.

It will be recognized from the disclosure herein that embodiments of the instant disclosure provide improvements to a number of technology areas, for example those related to systems and processes that handle or process fantasy sports contest generation and delivery to users over the internet. The disclosed systems and methods can effectuate increased speed, efficiency and accuracy in the ways that users can access and participate in contests offered by online fantasy sports systems. Users are provided with contests on a timely basis, and contest providers are provided with an automated tool which accurately, efficiently and speedily determines athlete salaries for each contest.

In accordance with one or more embodiments, a method is disclosed which includes receiving, at a computing device, a request to determine a plurality of fantasy salaries for use with a number of fantasy sports contests to be made available to users of an online fantasy sports system, the plurality of fantasy salaries corresponding to a plurality of athletes and a plurality of real world sports competitions on which each contest of the number is based; determining, at the computing device, a plurality of sets of factors for the plurality of athletes, the set of factors determined for an athlete of the plurality of athletes and used in a fantasy salary determination for the athlete comprising: a fantasy point projection factor, the fantasy point projection factor is an estimate of a number of fantasy points that the athlete is likely to score; a number of past performance factors, each past performance factor of the number representing a number of fantasy points scored by the athlete over a corresponding range of past real world competitions in which the athlete participated; and an ownership factor for an athlete of the plurality, the ownership factor representing a popularity of the athlete with users of the online fantasy sports system; and determining, using the computing device, a plurality of fantasy sports salaries corresponding to the plurality of athletes, the fantasy sports salary determination for the athlete of the plurality of athletes comprising a combination of the fantasy point projection factor, the number of past performance factors and the ownership factor in the set of factors determined for the athlete.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for automatically determining a fantasy salary for each athlete of a plurality of athletes using a set of factors determined for each athlete of the plurality.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DRAWINGS

The above-mentioned features and objects of the present disclosure will become more apparent with reference to the following description taken in conjunction with the accompanying drawings wherein like reference numerals denote like elements and in which.

Figure 7:
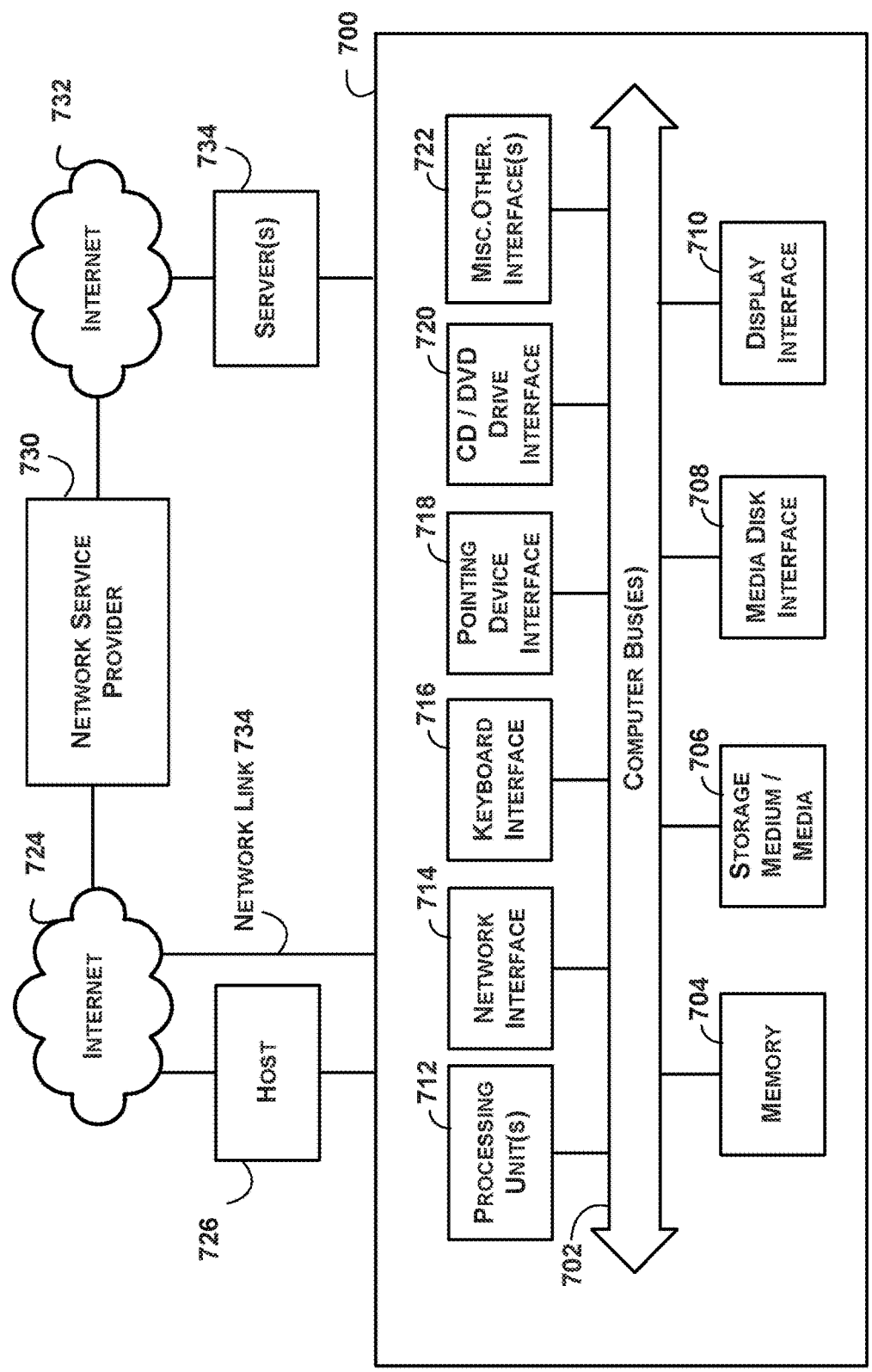

FIG. 5 provides an illustration of data which can be used in a fantasy point projection determination in accordance with one or more embodiments of the present disclosure;

FIGS. 6A and 6B provide examples of variables which can be used in an athlete fantasy salary determination in accordance with one or more embodiments of the present disclosure; and FIG. 7 is a block diagram illustrating the architecture of an exemplary hardware device in accordance with one or more embodiments of the present disclosure.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing or displaying various forms of content, including locally stored or streamed video, or games (such as fantasy sports leagues). The foregoing is provided to illustrate that claimed subject matter is intended to include a wide range of possible features or capabilities.

The detailed description provided herein is not intended as an extensive or detailed discussion of known concepts, and as such, details that are known generally to those of ordinary skill in the relevant art may have been omitted or may be handled in summary fashion.

With the widespread popularity of online fantasy sports contests, there is currently a huge demand for tools, such as the automated athlete salary determination tool disclosed herein, to facilitate publication of contests online and meet the demand resulting from such popularity. However, existing approaches for athlete salary determination are cumbersome to use because they require contest providers to manually determine each athlete's salary in each sport involved in a contest being provided, which as discussed above involves over 1000 contests per day and hundreds of athletes per sport. A contest provider cannot publish a contest without fantasy salaries; and once published, the contest provider cannot change the fantasy salaries. Furthermore, contestants cannot participate in the contest until the contest and a corresponding set of fantasy salaries is published. A manual approach is impractical, for at least the reasons that it requires extensive human effort, time and experience, and is prone to error and increases delays in the publication of online fantasy contests by providers of online fantasy contests.

As such, the instant disclosure provides a novel solution addressing the immediate demand for an automated system, application and/or platform that automatically determines, for each athlete of a plurality of athletes, the athlete's fantasy salary for use in one or more fantasy sports contests published by a fantasy contest provider. The present disclosure provides novel systems and methods for automatic determination of a fantasy salary for an athlete for use in one or more fantasy sports contests published by an online fantasy sports system.

According to some embodiments, the disclosed systems and methods first determine a value for each of a number of factors for determining an athlete's fantasy salary and then use a weighted combination (or aggregation), e.g., a linear combination, of the factors in determining the athlete's fantasy salary. The factors include a fantasy point projection, past performance and ownership. The fantasy point projection is a statistical prediction (or statistical estimation or projection) of a number of fantasy points an athlete is likely to score in a future real world competition if the athlete participates, or starts, in the real world competition. The fantasy point projection takes into account specifics of the real world competition, such as the quality of the athlete's opponent, whether the athlete is playing at home or on the road, whether the athlete tends to perform better or worse at home or on the road, etc.

In some embodiments, the past performance factor comprises one or more of immediate past performance, recent past performance and historical past performance factors. The historical past performance factor provides a long-term baseline of the athlete's past performance, and the immediate and recent past performance factors are responsive to "recent" real world circumstances that are likely to impact the athlete's long-term baseline. Examples of real world circumstances likely to impact an athlete's performance include the athlete's health, change in the athlete's role on the team, etc. The historical scope (or range) of each performance factor may vary depending on sport, athlete position, and number of "starts" by the athlete considered in determining each of these performance values. In one example, for each MLB athlete (or player) that is a hitter, immediate performance may be based on the athlete's (hitter's) performance in the athlete's last 5 starts, recent performance may be based on the athlete's last 30 starts and historical performance may be based on the athlete's last 80 starts. In another example, for each MLB athlete that is in a starting pitcher position, which position typically plays far less frequently than a hitter, the athlete's (starting pitcher's) immediate performance may be based on the starting pitcher's last 1-2 starts, recent performance may be based on the starting pitcher's last 6 starts and historical performance may be based on the starting pitcher's last 15 starts.

The ownership factor takes into account intangible aspects, such as the athlete's likability or popularity. An athlete's likability or popularity can be determined using data from past fantasy sports contests for which the athlete was available for selection by contestants. The athlete's popularity can be expressed as a percentage determined using the percentage of contestants that drafted the athlete, the percentage of fantasy teams (built by contestants) that included the athlete, etc. In some embodiments, the ownership factor can be used as an incentive or a disincentive. For example, the ownership factor can be varied in order to increase a popular athlete's fantasy salary, thereby acting as a disincentive for selection by a contestant working with a salary cap. As yet another example, the ownership factor can be decreased as an incentive for selection. In other words, the ownership factor for an athlete can be varied based on a determined popularity of the athlete to make the athlete more or less attractive to contestants.

The disclosed systems and methods can use a set of factors, such as the fantasy point projection, past performance and ownership factors, determined for a given athlete to determine the athlete's fantasy salary. Each factor may have an associated weight that can be used in the fantasy salary determination for the athlete. The weights assigned to each factor, which can vary, can be reflective of a desired importance of each factor on the salary determination. In one non-limiting example, the weights might be 0.39, 0.14, 0.29, 0.14 and 0.04 (which sum to 1.0) for a fantasy point projection factor, immediate past performance factor, recent past performance factor, historical past performance factor and ownership factor, respectively.

In some embodiments, a determined fantasy salary is verified against a global salary floor, or global minimum fantasy salary threshold. The global salary floor provides a mechanism to ensure that a determined fantasy salary is not unduly low. For example, the global salary floor can be used to address a real world circumstance in which an athlete is not expected to start in a real world athletic competition but unexpectedly does start. To illustrate by way of one non-limiting example, an athlete might have a correspondingly low fantasy point projection because the athlete is not expected to start in a real world competition. The athlete's fantasy salary can be depressed based on the low fantasy point projection, which is undesirable. For example and as discussed herein, a contest provider must publish fantasy salaries for athletes when a contest is launched, e.g., made available to users (contestants) as participants in a contest(s) via an online fantasy sports system. A fantasy sports contest is typically launched many hours or even many days before the start time of the real world athletic competition on which the fantasy sports contest is based. In contrast, users of the online fantasy sports system are able to change their fantasy sports teams until just prior to the start time of the real world athletic competition. As a result, where an unduly low fantasy salary is determined for an athlete due to the athlete's erroneously being projected to not play and then unexpectedly is slated to play after the unduly low fantasy salary is published, a user can take advantage of a change in an athlete's playing status that occurs after fantasy salaries are published. The athlete's deflated fantasy salary can result undesirable duplication over a number of lineups built by contestants.

One approach that may be used to address a low fantasy point projection is to lessen the impact of the factor on the fantasy salary determination by decreasing the weight used for the fantasy point projection based on its value, such that the weight is reduced for a low fantasy point projection.

Another approach, which is discussed in more detail below, is to verify a fantasy salary determined for an athlete against a global fantasy salary floor, or global fantasy salary minimum threshold. A global salary floor can vary based on an athlete's position. The global salary floor for a given position can be based on such factors as a likelihood that an athlete that plays the position could start (or play), an estimation of the number of points the athlete is likely to score if the athlete does play, etc. In one example, in football, a quarterback is likely to score a reasonable number of fantasy points, even if the quarterback is not especially good; and, it is not uncommon for a second or third string quarterback to unexpectedly start when a first or second quarterback on the depth chart gets injured. In this example, each quarterback can be assigned a significant minimum fantasy salary, so that he is not underpriced should he unexpectedly start.

Another aspect in determining an athlete's fantasy salary involves athletes with minimal past performance data, such as a new (e.g., rookie) athlete or an athlete returning from an injury. As one example, in the NFL, it is not uncommon for a rookie to accrue significant fantasy points based on the rookie's performance in the first few games played in the league. One approach that may be used for an athlete with minimal historical data, is to automatically determine the athlete's fantasy salary based on the athlete's fantasy point projection, and incorporate past performance in subsequent determinations as the athlete builds a performance history by playing in real world competitions. Another approach that may be used is to maintain an individual salary floor, or individual minimum threshold salary, for each rookie. A rookie's salary floor may be set by a contest provider, for example. An athlete's individual salary floor can be used (instead of the athlete's fantasy point projection) initially. Regardless of whether an athlete's fantasy point projection or individual salary floor is used, as past performance data becomes available for an athlete (as the athlete builds a history by playing in real world competitions), the past performance data can be used with the athlete's fantasy point projection, or the athlete's individual salary floor, to determine the athlete's fantasy salary.

As discussed below in more detail, the fantasy salaries automatically determined in accordance with embodiments of the present disclosure can be published with a contest by an online fantasy sports system, and used to limit, along with a fantasy sports salary cap set for the contest, a fantasy sports contestant's selection of athletes for a given contest. The determined athlete salaries can be published by displaying the salaries on a display at the contestant's computing device, for example.

For example, a salary cap set for a contest is displayed to a contestant, together with a listing of the athletes available for selection by the contestant and each athlete's fantasy salary determined in accordance with one or more embodiments disclosed herein; and the contestant is able to select a number of athletes within the confines set by the salary cap.

The benefits of the disclosed systems and methods are multi-fold and include: 1) the disclosed systems and methods provide a technologically based mechanism for automatic determination of fantasy salaries to accommodate any number of sports and any number of athletes per sport on any frequent, daily, weekly, etc., basis; (2) the proposed systems and methods are based on techniques that are specifically designed to automatically determine athlete salaries that make enough athletes roughly equally attractive to minimize lineup duplications; and (3) the disclosed systems and methods provide a mechanism for minimizing the impact of real world lineup changes on fantasy athlete selection.

Figure 1:
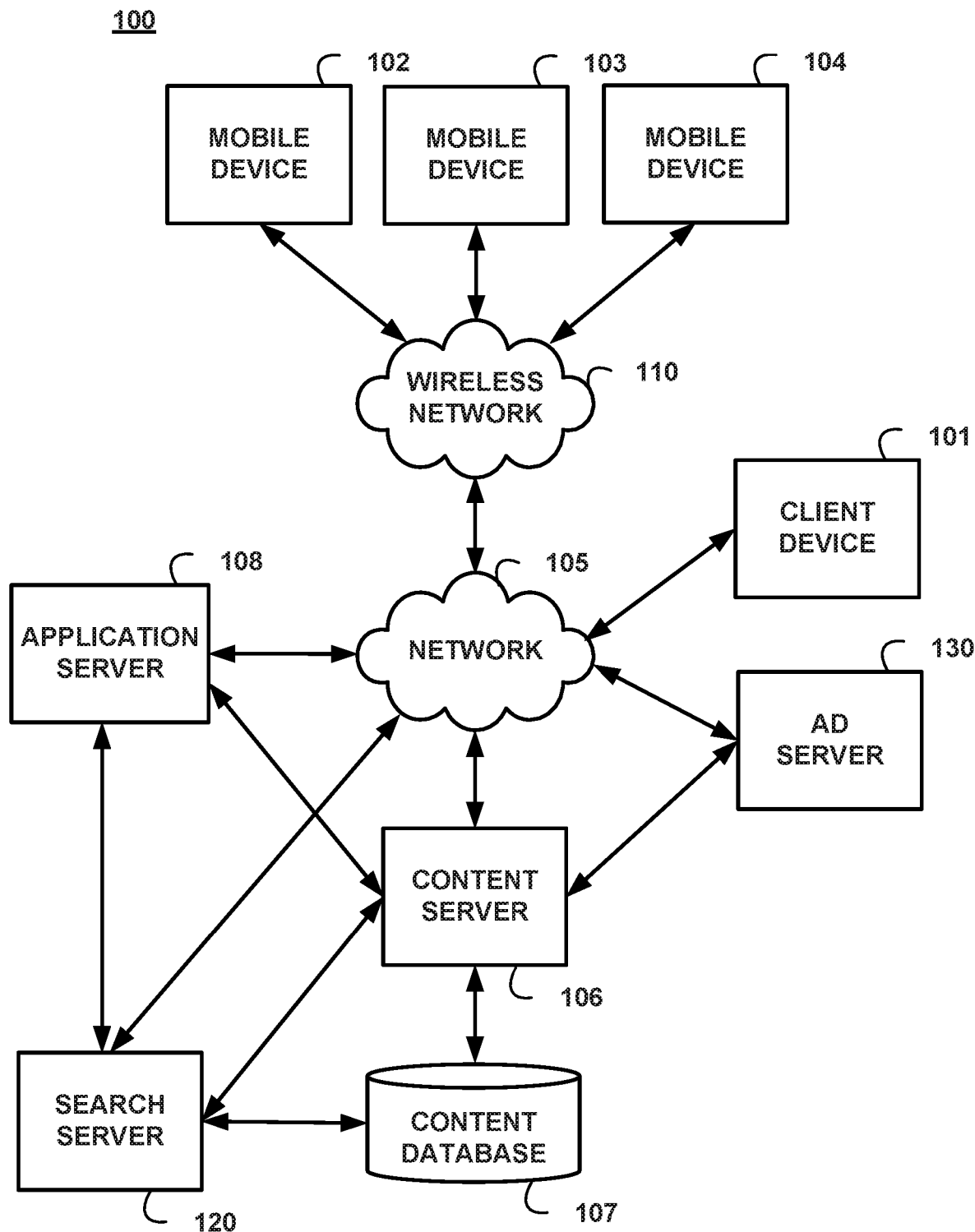
FIG. 1 is a schematic diagram illustrating an example of a network within which the systems and methods disclosed herein could be implemented according to some embodiments of the present disclosure.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, search server 120 and advertising ("ad") server 130.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as acquaintances, friends, family, colleagues, or co-workers, coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site or service, such as streaming media site/service (e.g., YouTube®), an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a video application and/or video platform, can be provided via the application server 108, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a streaming video application (e.g., YouTube®, Netflix®, Hulu®, iTunes®, Amazon Prime®, HBO Go®, and the like), blog, photo storage/sharing application or social networking application (e.g., Flickr®, Tumblr®, and the like), can be hosted by the application server 108 (or content server 106, search server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 16, 18, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
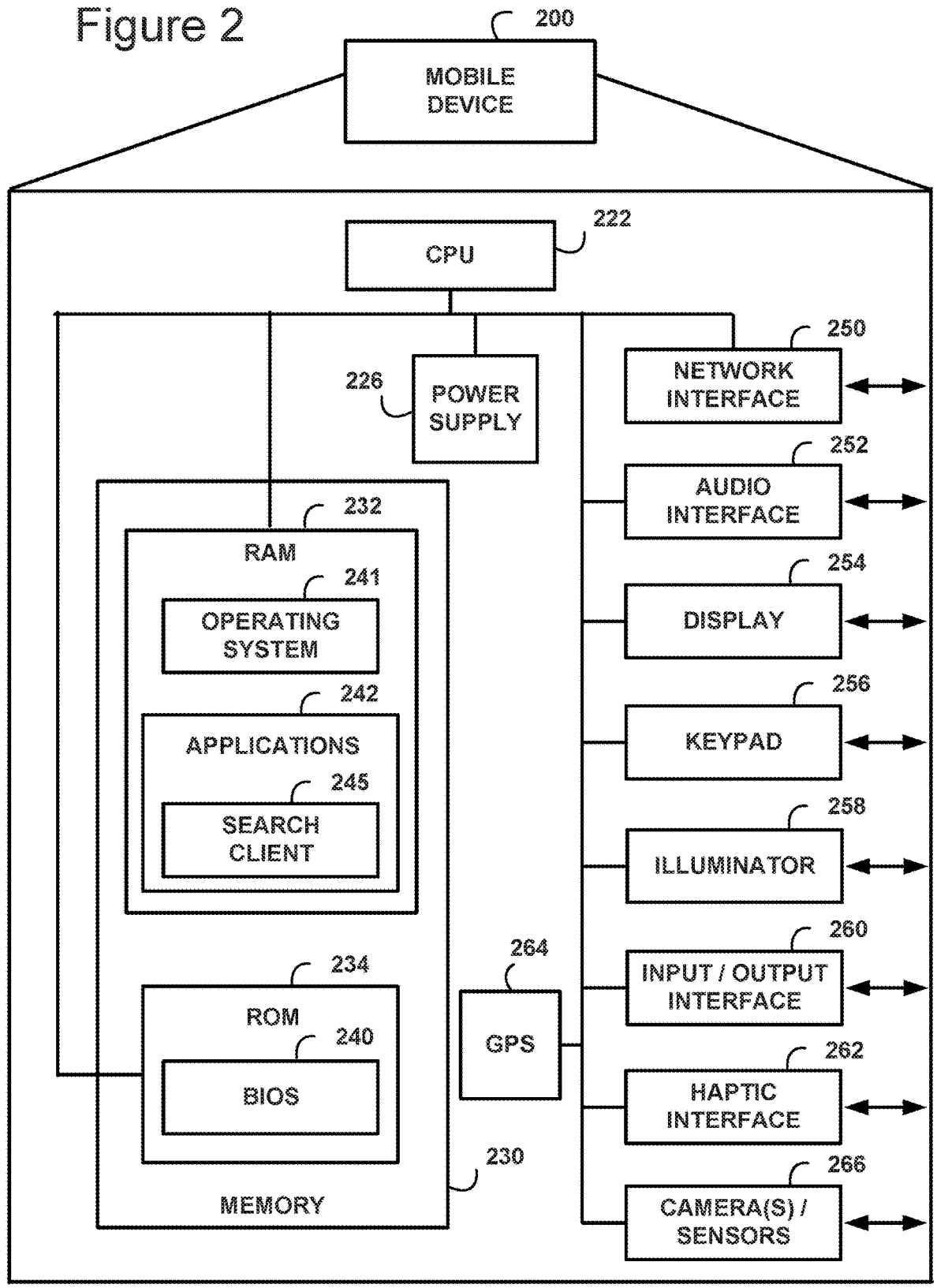
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the client device 200 receives a communication from another user.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by client device 200 to store, among other things, applications 242 and/or other data. For example, data stores may be employed to store information that describes various capabilities of client device 200. The information may then be provided to another device based on any of a variety of events, including being sent as part of a header during a communication, sent upon request, or the like. At least a portion of the capability information may also be stored on a disk drive or other storage medium (not shown) within client device 200.

Applications 242 may include computer executable instructions which, when executed by client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving advertisements, IMs, emails, and other types of known messages, or the like.

Having described the components of the general architecture employed within the disclosed systems and methods, the components' general operation with respect to the disclosed systems and methods will now be described below.

Figure 3:
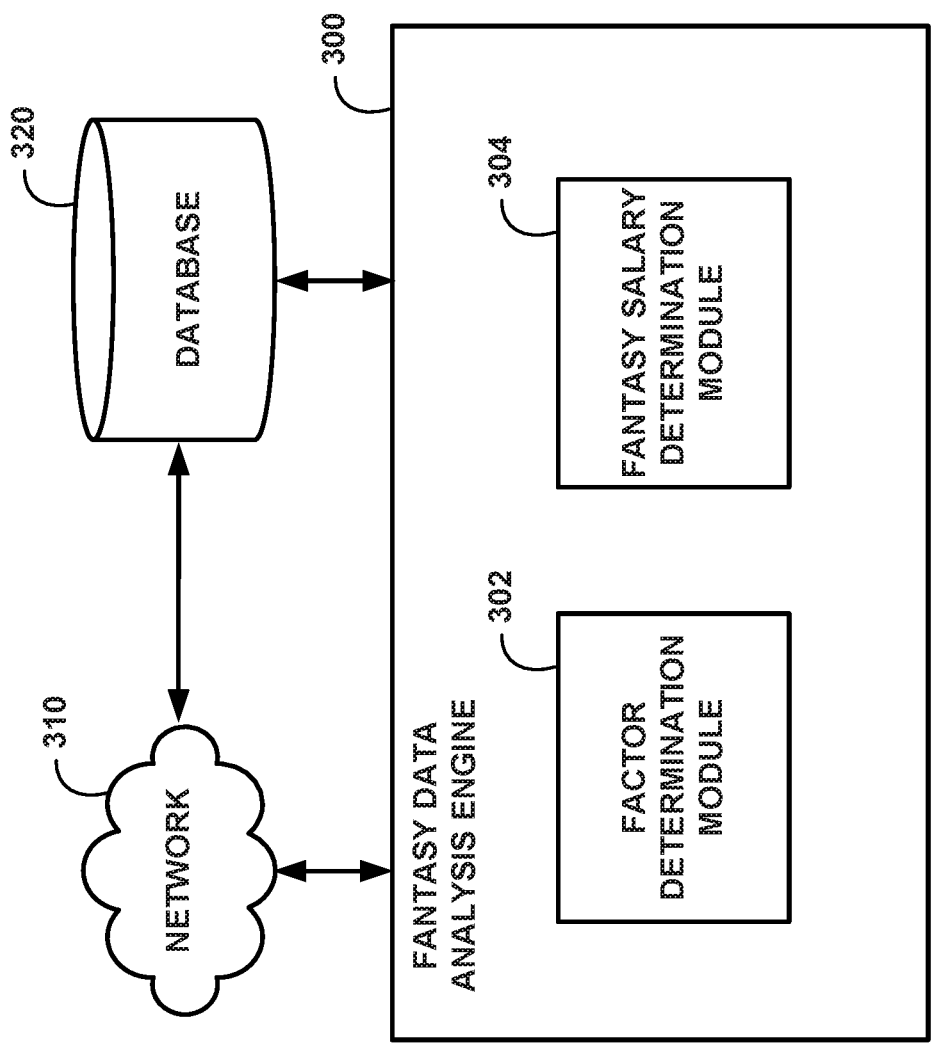
FIG. 3 is a schematic block diagram illustrating components of an exemplary system in accordance with embodiments of the present disclosure.

FIG. 3 is a block diagram illustrating the components for performing the systems and methods discussed herein. FIG. 3 includes a fantasy data analysis engine 300, network 310 and database 320. The fantasy data analysis engine 300 can be a special purpose machine or processor and could be hosted by an application server, content server, social networking server, web server, search server, content provider, email service provider, ad server, user's computing device, and the like, or any combination thereof. The fantasy data analysis engine 300 could be hosted by a server, e.g., an application server, content server, social networking server, web server, etc., hosting an online fantasy sports system. The fantasy data analysis engine 300 can exchange data with an online fantasy sports system hosted by a server, e.g., an application server, content server, social networking server, web server, etc., over network 310.

According to some embodiments, fantasy data analysis engine 300 can be embodied as a stand-alone application that executes on a user device. In some embodiments, the fantasy data analysis engine 300 can function as an application installed on the user's device, and in some embodiments, such application can be a web-based application accessed by the user device over a network. In some embodiments, the fantasy data analysis engine 300 can be installed as an augmenting script, program or application to another application, such as an online fantasy sports application, system, etc. hosted by one or more servers.

The database 320 can be any type of database or memory, and can be associated with a content server on a network (such as and without limitation a content server, search server, application server, etc.,) or a user's device. Database 320 comprises a dataset of data and metadata associated with local and/or network information related to users, services, applications, content (e.g., video) and the like. Such information can be stored and indexed in the database 320 independently and/or as a linked or associated dataset. It should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof. In some embodiments, the user data can also include user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can store data and metadata associated with fantasy salary determination, such as and without limitation fantasy salary determination factors and associated weights, global salary floor values, a number of individual salary floor values for a number of athletes, scaling coefficients (discussed below), and the like, for a number of contest providers. In addition, database 320 can store statistical data determined and/or retrieved from one or more external sources, such data as athlete projection data from an external source such as RotoWire.com (or other external source), past performance data from an external source such as Stats, LLC, or Stats-.com, (or other external source), etc. Furthermore, database 320 can store contest data for each contest, such as contest identification information (e.g., unique identifier, description/title, contest date and time, etc.), identification information for each contestant (e.g., unique identifier, name, date of birth, address, gender, etc.), information associating each contestant with each contest in which the contestant participated and each athlete selection made by each contestant for each contest, etc. Contest data can be used in determining an ownership factor for each athlete, for example.

The network 310 can be any type of network such as, but not limited to, a wireless network, a local area network (LAN), wide area network (WAN), the Internet, or a combination thereof. The network 110 facilitates connectivity of the image selection engine 300, and the database of stored resources 320. Indeed, as illustrated in FIG. 3, the fantasy data analysis engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as fantasy data analysis engine 300, and includes factor determination module 302 and fantasy salary determination module 304. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed with reference to FIG. 4.

As discussed in more detail below, the information processed by the fantasy data analysis engine 300 can be supplied to the database 320 in order to ensure that the information housed in the database 320 is up-to-date as the disclosed systems and methods leverage real-time information and/or behavior associated with an online fantasy sport system, user and/or the user's device during or responsive to fantasy sports data analysis, as discussed in more detail below.

Figure 4:
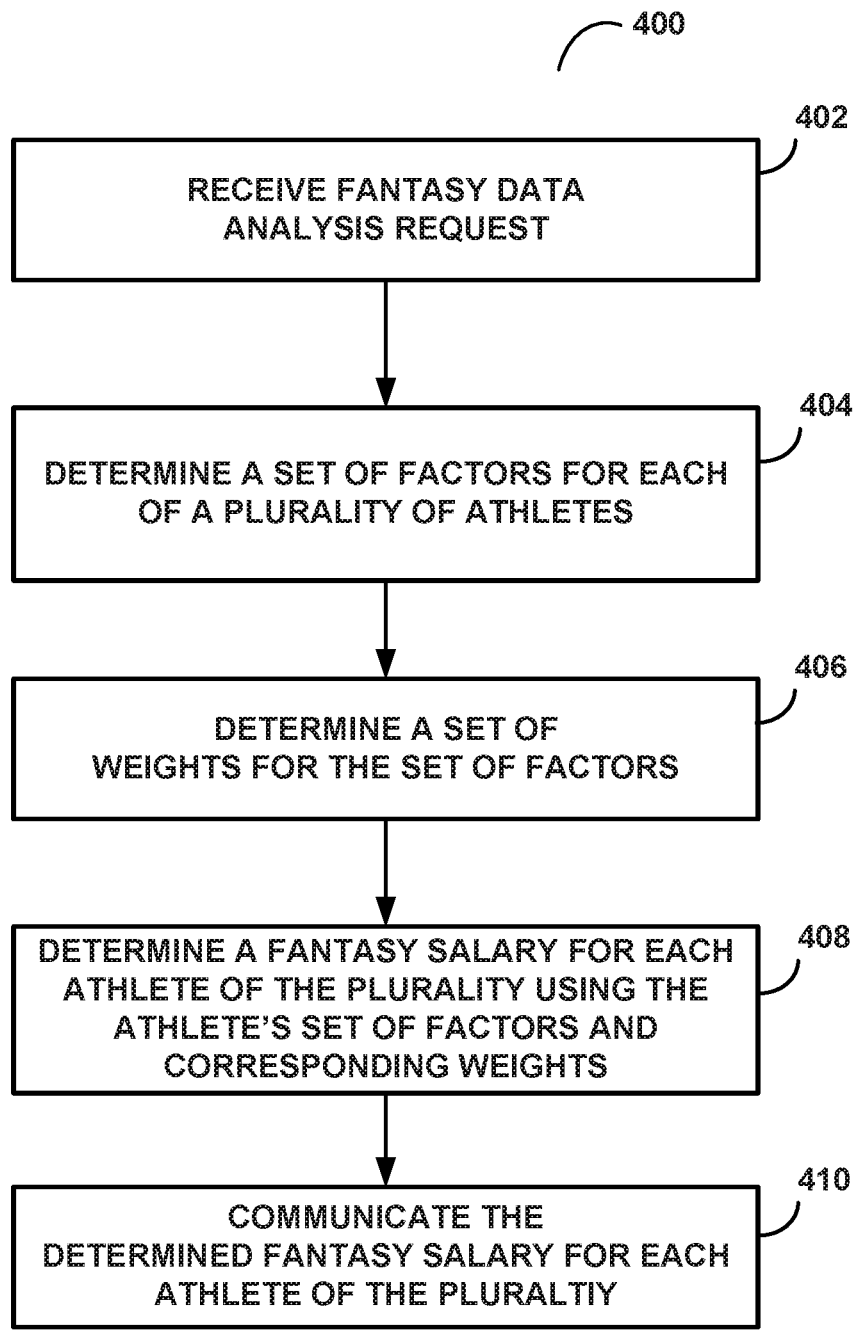
FIG. 4 is a flowchart illustrating steps performed in accordance with some embodiments of the present disclosure.

FIG. 4 provides a process flow overview in accordance with one or more embodiments of the present disclosure. Process 400 of FIG. 4 details steps performed in accordance with exemplary embodiments of the present disclosure for automatically determining a plurality of fantasy salaries corresponding to a plurality of real world athletes and for use in connection with an online fantasy sports system and its online users. According to some embodiments, as discussed herein with relation to FIG. 4, the process involves automatically determining a value for each of a number of fantasy salary determination factors for each of a plurality of athletes and then automatically using each athlete's determined fantasy salary determination factors in determining a fantasy salary for the athlete, as discussed in more detail below. Process 400 can be implemented by engine 300, with steps 404 and 406 being implemented by factor determination module 302 and step 408 being implemented by fantasy salary determination module 304.

At step 402, a fantasy data analysis request is received by engine 300. In some embodiments, the request comprises a request to determine a plurality of fantasy salaries corresponding to a plurality of athletes for use with a number of contests to be offered to users of an online fantasy sports system.

At step 404, a set of factors is determined for each athlete of a plurality of athletes. The set of factors that are to be determined for the athlete can be identified by engine 300 using data stored in the database 320. In one example and as described in more detail below in connection with FIGS. 6A and 6B, the database may store data identifying (or defining) which factors are to be used in determining an athlete's fantasy score. Engine 300 can use an athlete's sport and position to retrieve information comprising a definition of which factors are to be determined for the athlete and used in the athlete's fantasy salary determination.

According to some embodiments, the factors that may be used for a given athlete include a fantasy point projection factor, a number of past performance factor(s) and an ownership factor. The fantasy point projection is a statistical prediction (or statistical estimation or projection) of a number of fantasy points an athlete is likely to score in a future real world competition if the athlete participates, or starts, in the real world competition. The fantasy point projection takes into account specifics of the real world competition, such as the quality of the athlete's opponent, whether the athlete is playing at home or on the road, whether the athlete tends to perform better or worse at home or on the road, etc.

In accordance with one or more embodiments, the fantasy point projection can be determined using data received from an external source, such as RotoWire.com. In one example, data is received by engine 300 via a periodic (e.g., daily feed received after completion of the real-world competitions for the day) feed from the external source. The data can comprise a number of statistical projections for each athlete involved in an upcoming real world competition. FIG. 5 provides an example of statistical projections for MLB player David Ortiz. The example comprises a number of specific statistical predictions for the athlete. In the example, shown in FIG. 5, the statistical predictions comprise batting predictions (which are applicable to each MLB athlete) and pitching predictions (which are applicable to MLB pitchers). There are no pitching statistics for David Ortiz, who plays first base; however, pitching statistics can be used for a MLB pitcher.

In one example, values associated with a number of the statistical predictions associated with David Ortiz, such as batR (or "runs scored"), bat1B (or "single"), bat2B (or "double"), bat3B (or "triple), batHR (or "home run"), batRBI (or "runs batted in"), batSB (or "stolen bases") and batBB (or "walks"), can be aggregated to determine a fantasy point projection for the athlete. Of course, it should be apparent that this is just one example and that other projections, statistical data, etc., or other combinations thereof, can be used in determining a fantasy point projection for use in accordance with embodiments of the present disclosure.

In some embodiments of the present disclosure, a number of past performance factors can be used in combination with the fantasy point projection factor. Some examples of past performance factors that can be used include an immediate past performance factor, a recent past performance factor and a historical past performance factor. The historical past performance factor provides a long-term baseline of the athlete's past performance, and the immediate and recent past performance factors are responsive to real world circumstances that are likely to impact the athlete's long-term baseline.

FIGS. 6A and 6B provide some examples of past performance factors that can be used in connection with different professional sports and athlete positions within a given sport. With reference to FIG. 6A, three past performance factors can be used for MLB non-pitcher athletes: a past performance factor over the last 30 games, a past performance factor over the last 80 games, and a past performance factor over the last 5 games. For each past performance factor for a MLB non-pitcher athlete, various performance statistics over the associated range of games are used to determine a value for the past performance factor. In one example, a number of points is associated with a single (1B=2 points), double (2B=4 points), triple (3B=4 points), homerun (HR=8 points), run (R=2 points), run-batted-in (RBI=2 points), base-on-balls (BB=2 points), and stolen base (SB=4 points), and a point total over a past performance factor's corresponding number of games in which the athlete played is determined for the athlete based on the athlete's performance during the games. To further illustrate, assume that the MLB athlete had two singles, a double, two runs-batted-in and one stolen base in the last 5 MLB games in which the athlete participated, the MLB athlete's past performance factor $F_4$ is determined to have a value of 16, or $(2*2)+(1*4)+(2*2)+(1*4)=16$. The point-scoring structure used in this example is just one example of point-scoring structure that can be used, it should be apparent that any point-scoring structure can be used with embodiments of the present disclosure to determine a value of a past performance factor.

In some embodiments, the performance statistics used in determining each of a number of past performance factors can be received from an external source, such as Stats, LLC, or Stats.com, or other external source. In one example, the performance statistical data is received by engine 300 via a periodic (e.g., daily feed received after completion of the real-world competitions for the day) feed from the external source.

As illustrated in the examples shown in FIGS. 6A and 6B, a different number of past performance factors (each of which has a historical scope or range, such as a number of real world competitions in which the athlete has played) can be used with different sports and with different positions with a given sport. For example, in the MLB examples, three past performance factors are used with non-pitcher athletes, while two past performance factors are used with pitcher athletes. One reason for this is that pitchers play far less frequently than non-pitchers.

FIGS. 6A and 6B include examples of past performance factors (and an associated range for each) for MLB, NFL, NHL and NBA athletes. Of course, these are examples; it should be apparent that any number of past performance factors (and associated ranges) can be used in connection with embodiments of the present disclosure.

Another factor that can be included in the set of factors determined for an athlete at step 404 is an ownership factor, which takes into account intangible aspects, such as the athlete's likability or popularity. An athlete's likability or popularity can be determined using data from past fantasy sports contests for which the athlete was available for selection by contestants. By way of some examples, the ownership factor can be expressed as a percentage of contestants that drafted the athlete, the percentage of fantasy teams (built by contestants) that included the athlete, etc. In some embodiments, the ownership factor can be used as an incentive or as a disincentive. For example, the ownership factor can be varied (e.g., increased) in order to increase a popular athlete's fantasy salary, thereby acting as a disincentive for selection by a contestant working with a salary cap. Conversely, the ownership factor can be varied (e.g., decreased) in order to decrease the fantasy salary of an athlete that is determined to be less popular, as an incentive for selection. In other words, the ownership factor for an athlete can be varied based on a determined popularity of the athlete to make the athlete more or less attractive for selection by contestants.

With reference to FIG. 6B, an ownership (OP) factor example is provided for NBA athletes. In the example, the OP factor is expressed as a fantasy dollar amount, two fantasy dollars. Alternatively, the OP factor can be expressed as a percentage. In the example, an athlete's fantasy salary is increased by the OP factor amount of two dollars if certain conditions exist with respect to the athlete. The series indicates a number of real world basketball games played in a given day. For example, a 2-game series corresponds to a day with two NBA games played. In the example, there are 15 different series, one of which is chosen for determining an ownership factor for a given athlete. In the example, the series with the most contests in a given day is used. In the example, if an athlete's ownership (or inclusion in lineups formed by contestants) is two times more than an expected average ownership, the athlete's salary is increased by the OP amount, e.g., two dollars. Each of the remaining conditions use a percentage of the number of lineups formed by contestants in a determination of whether or not to increase an athlete's salary by the OP amount. In the case of a 9-game series, for example, athlete's fantasy salary is increased by the OP amount if the number of lineups formed by contestants that included the athlete was at least 14.8% of a total number of lineups formed by contestants.

At step 406 of FIG. 4, a weight is determined for each factor in the set of factors used in determining a given athlete's fantasy salary. Referring again to FIGS. 6A and 6B, each factor, e.g., $F_1$, $F_2$, $F_3$, etc., has an associated weight, which represents an importance of the factor relative to the other factors. In some embodiments, the weights can be predetermined and stored in database 320 for retrieval by the engine 300 based on the athlete's sport and position.

At step 408, a fantasy salary is determined for each athlete of the plurality of athletes using the set of factors determined for the athlete at step 404 and the corresponding set of weights determined at step 406. In accordance with one or more embodiments, a fantasy salary is determined for an athlete using the set of factors and weights determined for the athlete at steps 404 and 406. Where there is a global salary floor (GSF) associated with an athlete, the athlete's fantasy salary (FS) can be determined to be a maximum (or max) of the athlete's determined fantasy salary (DS) and the global salary floor (GSF), which determination is represented in exemplary expression (1) below:

$$FS = \max[DS, GSF] \qquad \text{Expr. (1)}$$

An athlete's determined salary, DS, is determined using the set of factors and the weights determined in steps 404 and 406 discussed above. As illustrated below in exemplary expression (2), the athlete's determined salary, DS, can be determined using a linear combination of the weighted values of the factors in the set of factors, as illustrated in the following exemplary expression (2):

$$DS = \{[A * ((W_{FPP} * FPP) + (\Sigma_{i=1}^{n} W_i * F_i))] + [W_{OP} * F_{OP}]\} \qquad \text{Expr. (2),}$$

where FPP represents the value of the athlete's fantasy point projection and $W_{FPP}$ represents the value of the fantasy point projection's weight, $F_i$ represents the value of one of the n number of past performance factor values determined for the athlete using the athlete's past performance in real world competitions, $W_i$ represents the weight to be used with $F_i$, for each i of the n number of past performance factors, $F_{OP}$ represents the value of the ownership factor determined for the athlete and $W_{OP}$ represents the weight for the ownership factor.

The variable A is a scaling coefficient (or scaling constant) that can be used in one or more embodiments. The value of A can be selected to make fantasy salaries fall within a desired range. In one example in which a salary cap of 200 fantasy dollars per team is set, A can be set to ensure that fantasy salaries are high enough to limit the number (e.g., one or two) of star athletes that a contestant can afford (is able) to include on the contestant's fantasy team (or lineup). In this example, A can be set so that a contestant is able to include at least one star (or high-performing) athlete and fill out the remainder of the fantasy lineup with other, non-star (or lower-performing), athletes without exceeding the fantasy salary cap. As yet another example, assume that the best NHL athletes average 13-16 fantasy points per game, $F_1$, $F_2$ and $F_3$ have ranges of 5 games, 15 games and 40 games (respectively), selecting a value of A that is roughly equal to 3 yields NHL athlete fantasy salaries in the low 40s for the best players in the league.

Exemplary expression (3) provides one example of in which a value is determined for the ownership factor for an athlete. In the example shown in expression (3), the value is determined using a maximum of zero and a percentage owned during a recent game in which the athlete played and a maximum ownership threshold.

$$F_{OP}=\max[0,(OP-OP_{Threshold})] \qquad \text{Expr. (3)}$$

To illustrate, assume that the percentage of contestant lineups in which an athlete is included is less than the threshold maximum ownership percentage, the value of $F_{OP}$ would be set to zero (the maximum of 0 and the negative result of the parenthetical expression). The same result occurs if OP and $OP_{Threshold}$ are equal. However, if the value of OP is greater than $OP_{Threshold}$, then the value of $F_{OP}$ is set to the result of the parenthetical expression. The threshold maximum ownership percentage can vary based on considerations such as, the sport, the number of real world competitions offered on a day of the most recent real world competition in which the athlete played, etc.

Expression (3) is one example of an approach that can be used in determining a value of the ownership factor. Other approaches, including the approach discussed above in connection with FIG. 6B, may be used to determine the ownership factor's value for an athlete.

As illustrated in exemplary expression (1), a determined fantasy salary can be verified against a global salary floor, or global minimum fantasy salary threshold. The global salary floor provides a mechanism to ensure that a determined fantasy salary is not unduly low. For example, the global salary floor can be used to address a real world circumstance in which an athlete is not expected to start in a real world athletic competition but unexpectedly does start. To illustrate by way of one non-limiting example, an athlete might have a correspondingly low fantasy point projection because the athlete is not expected to start in a real world competition. The athlete's fantasy salary can be depressed based on the low fantasy point projection, which is undesirable. For example and as discussed herein, a contest provider must publish fantasy salaries for athletes when a contest is launched, e.g., made available to users (contestants) as participants in a contest(s) via an online fantasy sports system. A fantasy sports contest is typically launched many hours or even many days before the start time of the real world athletic competition on which the fantasy sports contest is based. In contrast, users of the online fantasy sports system are able to change their fantasy sports teams until just prior to the start time of the real world athletic competition. As a result, where an unduly low fantasy salary is determined for an athlete due to the athlete's erroneously being projected to not play and then unexpectedly is slated to play after the unduly low fantasy salary is published, a user can take advantage of a change in an athlete's playing status that occurs after fantasy salaries are published. The athlete's deflated fantasy salary can result undesirable duplication over a number of lineups built by contestants.

Exemplary expression (1) uses one approach to address a fantasy salary determination that is considered to be undesirably low, which uses a global fantasy salary floor, or global fantasy salary minimum threshold to verify a fantasy salary determined for an athlete. A global salary floor can vary based on an athlete's position. The global salary floor for a given position can be based on such factors as a likelihood that an athlete that plays the position could start (or play), an estimation of the number of points the athlete is likely to score if the athlete does play, etc.

Another aspect that may be taken into account by engine 300 in determining an athlete's fantasy salary (at step 408) is whether or not the athlete has enough past performance data to use exemplary expression (2). An athlete, such as a new athlete (e.g., a rookie athlete) or an athlete returning from an injury, may not have enough past performance data. One approach that may be used for an athlete with minimal historical data, is to automatically determine the athlete's fantasy salary based on the athlete's fantasy point projection, and incorporate past performance in subsequent determinations as the athlete builds a performance history by playing in real world competitions. Another approach that may be used is to maintain an individual salary floor, or individual minimum threshold salary. An athlete's individual salary floor can be used (instead of the athlete's fantasy point projection) initially.

Regardless of whether an athlete's fantasy point projection or individual salary floor is used, as past performance data becomes available for an athlete (as the athlete builds a history by playing in real world competitions), the past performance data can be used, e.g., in exemplary expression (2), together with the athlete's individual salary floor or a fantasy point projection for the athlete. For example, using the past performance factors for an NFL running back shown in FIG. 6A, the past performance factor, $F_1$, can be used one the running back plays in at least 4 games, the past performance factor, $F_2$, can be included in the athlete's fantasy salary determination after the running back has played in at least 10 games, etc.

At step 410, the plurality of fantasy salaries determined, at step 408, for the plurality of athletes can be published online for contestants, e.g., users of an online fantasy sports system. In one example, athlete fantasy salaries automatically determined at step 408 can be published with a contest by an online fantasy sports system, and used to limit, along with a fantasy sports salary cap set for the contest, a fantasy sport's contestant's selection of athletes for a given contest. A fantasy salary determined for each of a plurality of athletes can be published by displaying the salaries on a display at the contestant's computing device, for example. For example, a salary cap set for a contest is displayed to a contestant, together with a listing of the athletes available for selection by the contestant and each athlete's fantasy salary determined in accordance with one or more embodiments disclosed herein; and the contestant is able to select a number of athletes within the confines set by the salary cap.

By way of yet another non-limiting example, the fantasy salaries determined for a plurality of athletes in accordance with embodiments disclosed herein can be transmitted to a number of client devices 101 and/or mobile device's over an electronic communications network, which may include network 105 and 110, in connection with a number of contests of a contest provider published by an online fantasy sports system implemented by application server 108.

As shown in FIG. 7, internal architecture 700 of a computing device(s), computing system, computing platform, user devices, set-top box, smart TV and the like includes one or more processing units, processors, or processing cores, (also referred to herein as CPUs) 712, which interface with at least one computer bus 702. Also interfacing with computer bus 702 are computer-readable medium, or media, 706, network interface 714, memory 704, e.g., random access memory (RAM), run-time transient memory, read only memory (ROM), media disk drive interface 720 as an interface for a drive that can read and/or write to media including removable media such as floppy, CD-ROM, DVD, media, display interface 710 as interface for a monitor or other display device, keyboard interface 716 as interface for a keyboard, pointing device interface 718 as an interface for a mouse or other pointing device, and miscellaneous other interfaces not shown individually, such as parallel and serial port interfaces and a universal serial bus (USB) interface.

Memory 704 interfaces with computer bus 702 so as to provide information stored in memory 704 to CPU 712 during execution of software programs such as an operating system, application programs, device drivers, and software modules that comprise program code, and/or computer executable process steps, incorporating functionality described herein, e.g., one or more of process flows described herein. CPU 712 first loads computer executable process steps from storage, e.g., memory 704, computer readable storage medium/media 706, removable media drive, and/or other storage device. CPU 712 can then execute the stored process steps in order to execute the loaded computer-executable process steps. Stored data, e.g., data stored by a storage device, can be accessed by CPU 712 during the execution of computer-executable process steps.

Persistent storage, e.g., medium/media 706, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 728 typically provides information communication using transmission media through one or more networks to other devices that use or process the information. For example, network link 728 may provide a connection through local network 724 to a host computer 726 or to equipment operated by a Network or Internet Service Provider (ISP) 730. ISP equipment in turn provides data communication services through the public, worldwide packet-switching communication network of networks now commonly referred to as the Internet 732.

A computer called a server host 734 connected to the Internet 732 hosts a process that provides a service in response to information received over the Internet 732. For example, server host 734 hosts a process that provides information representing video data for presentation at display 710. It is contemplated that the components of system 700 can be deployed in various configurations within other computer systems, e.g., host and server.

At least some embodiments of the present disclosure are related to the use of computer system 700 for implementing some or all of the techniques described herein. According to one embodiment, those techniques are performed by computer system 700 in response to processing unit 712 executing one or more sequences of one or more processor instructions contained in memory 704. Such instructions, also called computer instructions, software and program code, may be read into memory 704 from another computer-readable medium 706 such as storage device or network link. Execution of the sequences of instructions contained in memory 704 causes processing unit 712 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 700. Computer system 700 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 702 as it is received, or may be stored in memory 704 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

The invention claimed is:

1. A method comprising:
   determining, by a computing device of an online fantasy sports system, a plurality of fantasy sports salaries for use with a fantasy sports contest of the online fantasy sports system, the plurality of fantasy sports salaries corresponding to a plurality of real-world athletes, determination of a fantasy sports salary for an athlete of the plurality comprising:
      determining a number of factors for the fantasy sports salary for the athlete; and
      determining the fantasy sports salary for the athlete using the number of factors, the determining comprising:
         making a determination that a threshold amount of past performance data exists for the athlete and including past performance as a factor of the number of factors based on the determination;
   communicating, via the computing device and over an electronic communications network to each user computing device of a plurality of users of the online fantasy sports system, a fantasy sports salary cap and the plurality of fantasy sports salaries corresponding to the plurality of athletes, the communicating causing the plurality of fantasy sports salaries and the fantasy sports salary cap to be displayed at each user computing device of the plurality of users;
   receiving, at the computing device over the electronic communications network and from the user computing devices, athlete selection input from a number of users, of the plurality of users, participating in the fantasy sports contest of the online fantasy sports system; and
   determining, by the computing device and using the athlete selection input received from the number of users, a popularity of each selected athlete for use as a factor, of the number of factors, in minimizing athlete selection duplication in a subsequent fantasy sports contest.

2. The method of claim 1, selectively including past performance as a factor of the number of factors based on the amount of past performance data associated with the athlete further comprising:
   making a determination that a first amount of past performance data for the athlete is insufficient to use in determining the fantasy sports salary for the athlete; and
   determining the fantasy sports salary for the athlete exclusive of the athlete's past performance.

3. The method of claim 2, further comprising:
   obtaining a second amount of past performance data in addition to the first amount of past performance data; and
   determining a subsequent fantasy sports salary for the athlete using the athlete's past performance as a factor, the athlete's past performance being determined using the first and second amounts of past performance data.

4. The method of claim 2, the first amount of past performance data is associated with an initial number of real-world competitions involving the athlete.

5. The method of claim 4, the athlete is a rookie player.

6. The method of claim 4, the athlete is a player returning to the real-world competitions after a break.

7. The method of claim 2, determining the fantasy sports salary for the athlete exclusive of the athlete's past performance further comprising:
   determining the fantasy sports salary for the athlete using a fantasy point projection indicating a number of fantasy points the athlete is likely to score in future real-world competition.

8. The method of claim 7, the fantasy point projection takes into account aspects of the future real-world competition, including the quality of the athlete's opponent and whether the future real-world competition is at home or away.

9. The method of claim 2, determining the fantasy sports salary for the athlete exclusive of the athlete's past performance further comprising:
   determining the fantasy sports salary for the athlete using a minimum threshold salary associated with the athlete.

10. The method of claim 1, the number of factors comprising an ownership factor that takes into account the popularity of the athlete with users of the online fantasy sports system.

11. The method of claim 10, the ownership factor acting to increase the fantasy sports salary of the athlete as a disincentive for user selection in a case that the athlete is identified as being popular with users of the online fantasy sports system.

12. A non-transitory computer-readable storage medium tangibly encoded with computer-executable instructions that when executed by a processor associated with a computing device perform a method comprising:
   determining a plurality of fantasy sports salaries for use with a fantasy sports contest of an online fantasy sports system, the plurality of fantasy sports salaries corresponding to a plurality of real-world athletes, determination of a fantasy sports salary for an athlete of the plurality comprising:
      determining a number of factors for the fantasy sports salary for the athlete; and
      determining the fantasy sports salary for the athlete using the number of factors, the determining comprising:
         making a determination that a threshold amount of past performance data exists for the athlete and including past performance as a factor of the number of factors based on the determination;
   communicating, over an electronic communications network to each user computing device of a plurality of users of the online fantasy sports system, a fantasy sports salary cap and the plurality of fantasy sports salaries corresponding to the plurality of athletes, the communicating causing the plurality of fantasy sports salaries and the fantasy sports salary cap to be displayed at each user computing device of the plurality of users;
   receiving, over the electronic communications network and from the user computing devices, athlete selection input from a number of users, of the plurality of users, participating in the fantasy sports contest of the online fantasy sports system;
   determining, using the athlete selection input received from the number of users, a popularity of each selected athlete for use as a factor, of the number of factors, in minimizing athlete selection duplication in a subsequent fantasy sports contest.

13. The non-transitory computer-readable storage medium of claim 12, selectively including past performance as a factor of the number of factors based on the amount of past performance data associated with the athlete further comprising:
making a determination that a first amount of past performance data for the athlete is insufficient to use in determining the fantasy sports salary for the athlete; and
determining the fantasy sports salary for the athlete exclusive of the athlete's past performance.

14. The non-transitory computer-readable storage medium of claim 13, further comprising:
obtaining a second amount of past performance data in addition to the first amount of past performance data; and
determining a subsequent fantasy sports salary for the athlete using the athlete's past performance as a factor, the athlete's past performance being determined using the first and second amounts of past performance data.

15. The non-transitory computer-readable storage medium of claim 13, determining the fantasy sports salary for the athlete exclusive of the athlete's past performance further comprising:
determining the fantasy sports salary for the athlete using a fantasy point projection indicating a number of fantasy points the athlete is likely to score in future real-world competition.

16. The non-transitory computer-readable storage medium of claim 15, the fantasy point projection takes into account aspects of the future real-world competition, including the quality of the athlete's opponent and whether the future real-world competition is at home or away.

17. The non-transitory computer-readable storage medium of claim 13, determining the fantasy sports salary for the athlete exclusive of the athlete's past performance further comprising:
determining the fantasy sports salary for the athlete using a minimum threshold salary associated with the athlete.

18. The non-transitory computer-readable storage medium of claim 12, the number of factors comprising an ownership factor that takes into account the popularity of the athlete with users of the online fantasy sports system.

19. The non-transitory computer-readable storage medium of claim 18, the ownership factor acting to increase the fantasy sports salary of the athlete as a disincentive for user selection in a case that the athlete is identified as being popular with users of the online fantasy sports system.

20. A computing device comprising:
a processor;
a non-transitory storage medium for tangibly storing thereon program logic for execution by the processor, the program logic comprising:
determining logic executed by the processor for determining a plurality of fantasy sports salaries for use with a fantasy sports contest of an online fantasy sports system, the plurality of fantasy sports salaries corresponding to a plurality of real-world athletes, determination of a fantasy sports salary for an athlete of the plurality comprising:
determining logic executed by the processor for determining a number of factors for the fantasy sports salary for the athlete; and
determining logic executed by the processor for determining the fantasy sports salary for the athlete using the number of factors, the determining comprising:
making logic executed by the processor for making a determination that a threshold amount of past performance data exists for the athlete and including past performance as a factor of the number of factors based on the determination;
communicating logic executed by the processor for communicating, over an electronic communications network to each user computing device of a plurality of users of the online fantasy sports system, a fantasy sports salary cap and the plurality of fantasy sports salaries corresponding to the plurality of athletes, the communicating causing the plurality of fantasy sports salaries and the fantasy sports salary cap to be displayed at each user computing device of the plurality of users;
receiving logic executed by the processor for receiving, over the electronic communications network and from the user computing devices, athlete selection input from a number of users, of the plurality of users, participating in the fantasy sports contest of the online fantasy sports system
determining logic executed by the processor for determining, using the athlete selection input received from the number of users, a popularity of each selected athlete for use as a factor, of the number of factors, in minimizing athlete selection duplication in a subsequent fantasy sports contest.

* * * * *